Figure 1:
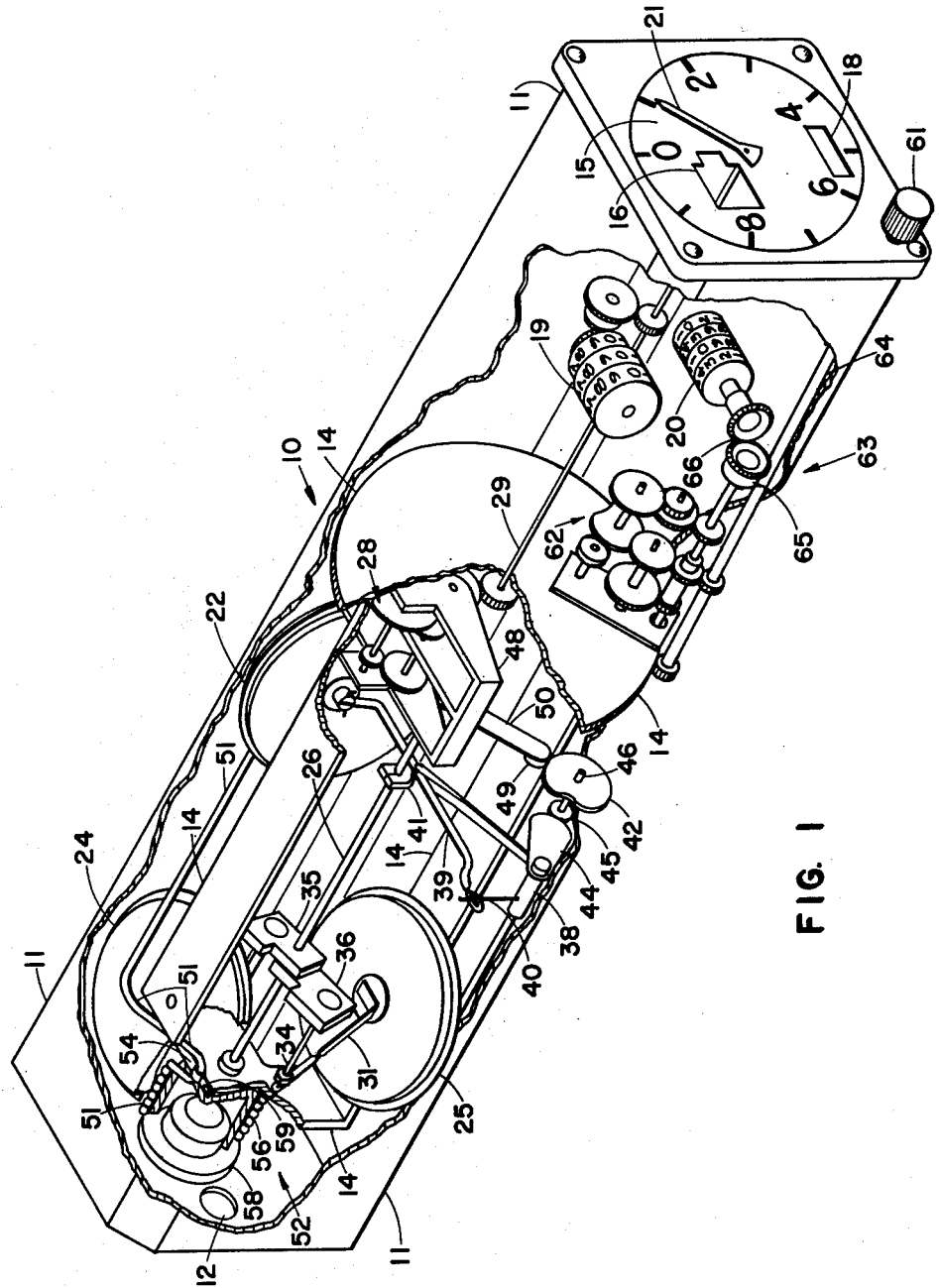

INVENTOR.
C. E. JOHANSON
BY Roger W Nolan Jr
ATTORNEY

United States Patent Office 3,191,439
Patented June 29, 1965

3,191,439
ALTITUDE SENSING APPARATUS
Carl E. Johanson, Davenport, Iowa, assignor to The Bendix Corporation, Davenport, Iowa, a corporation of Delaware
Filed Feb. 24, 1961, Ser. No. 91,386
4 Claims. (Cl. 73—387)

This invention relates to improvements in altitude sensing and indicating apparatus and more particularly to an improved altimeter including sensed altitude pressure and barometric pressure compensating means.

Conventional altimeters used in high performance air vehicles do not give a continuous accurate indication of true altitude because of the variations in altitude pressure sensed by the static tube which opens at the exterior of the craft and will not give a true indication of altitude above ground level because of variations in barometric pressure. This error which results in conventional altimeters is intolerable in many situations including the maintaining of a particular altitude in flight and the indication of true altitude above ground on landing. The resultant error has resulted in specially designed systems which are costly, complex, and require external power sources for operation.

An object of the invention is to provide an altimeter which will compensate for variations in barometric pressure and for variations in indicated altitude pressure as sensed by the static tube because of changes in flight conditions such as Mach number.

Another object of the invention is to provide a self-contained, relatively low cost altimeter providing an improved accurate indication of true altitude.

Altimeters designed to compensate for variations in altitude because of variations in the sensed altitude pressure are known in the altimeter art and such apparatus may be found in my United States Patent No. 3,154,944 which was granted on November 3, 1964, and assigned to the assignee of the present invention. Altimeters designed to compensate for variations in barometric pressure are old in the altimeter art, a representative design of barometric compensation mechanisms is disclosed in Patent Number 1,970,544 issued August 21, 1934 to V. E. Carbonara and assigned to the assignee of the present invention.

As disclosed in the aforementioned Patent Number 3,154,944, the ratio of the sensed altitude pressure to actual altitude pressure varies as a complex function which can be related, even if indirectly, to Mach number. An altimeter of this type is a pressure tight unit requiring a static pressure responsive capsule and a dynamic pressure responsive capsule. The sensed altitude pressure is transmitted to the interior of the case whereby the static pressure capsule expands or contracts in relation to sensed altitude pressure. The dynamic pressure capsule is in communication with a dynamic pressure sensing line and a pick-up means disposed exterior of the air vehicle. Conventional altimeters including barometric compensation of the type disclosed in the aforementioned patent, Patent Number 1,970,544, comprise a pressure tight unit including a housing having a rotating interior cage on which a static pressure responsive capsule is mounted. The interior cage and the attached altitude indicating means is rotated in accordance with barometric pressure by means of a knob accessible for movement exteriorly of the instrument.

An altimeter having the aforementioned features of sensed altitude pressure and barometric pressure compensation requires the static pressure and dynamic pressure responsive capsule mounted on a rotating cage member inside of a pressure tight housing. The rotating cage member requires a complex dynamic pressure sensing connection from the housing to the dynamic pressure capsule mounted on the rotating cage member. Fuid tight rotating seals are well known but encounter substantial design difficulties including the obtaining of a good seal under variable pressure conditions and the proper alignment of the rotating mechanisms.

A further object of the present invention is to provide an altimeter having a flexible dynamic pressure conduit connecting the altimeter housing and the dynamic pressure capsule.

A still further object of the present invention is to provide an altimeter having a coiled flexible dynamic pressure tubing connecting the housing and the dynamic pressure capsule.

A still further object of the invention is to provide an altimeter having a barometric pressure and sensed altitude pressure compensation wherein rotating seals are eliminated and alignment of the rotating cage and the housing are not critical.

Conventional altimeters which have a barometric set mechanism include an adjusting knob, gear train, a rotating cage assembly, and dial indicating means. Mechanisms of this type require close toleranced components or spring means to eliminate undesirable back-lash which would otherwise impair the instrument's accuracy.

A still further object of the invention is to provide an altimeter having a coiled flexible tubing whereby the back-lash of the barometric set mechanism is substantially reduced.

A still further object of the invention is to provide an altimeter including a dynamic pressure responsive capsule and a coiled flexible tubing in communication therewith having good damping characteristics.

Certain of these objects are realized in the invention by the provision of a housing having a dynamic pressure inlet, a cage member movable relative to and within said housing, dynamic and static pressure responsive elements mounted in said cage member, flexible means extending between and inter-connecting said dynamic pressure inlet and the interior of said dynamic pressure responsive element.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purposes of illustration and description and is not to be construed as defining the limits of the invention.

FIGURE 1 of the drawing is a schematic showing of an altimeter embodying the invention.

Figure 2:
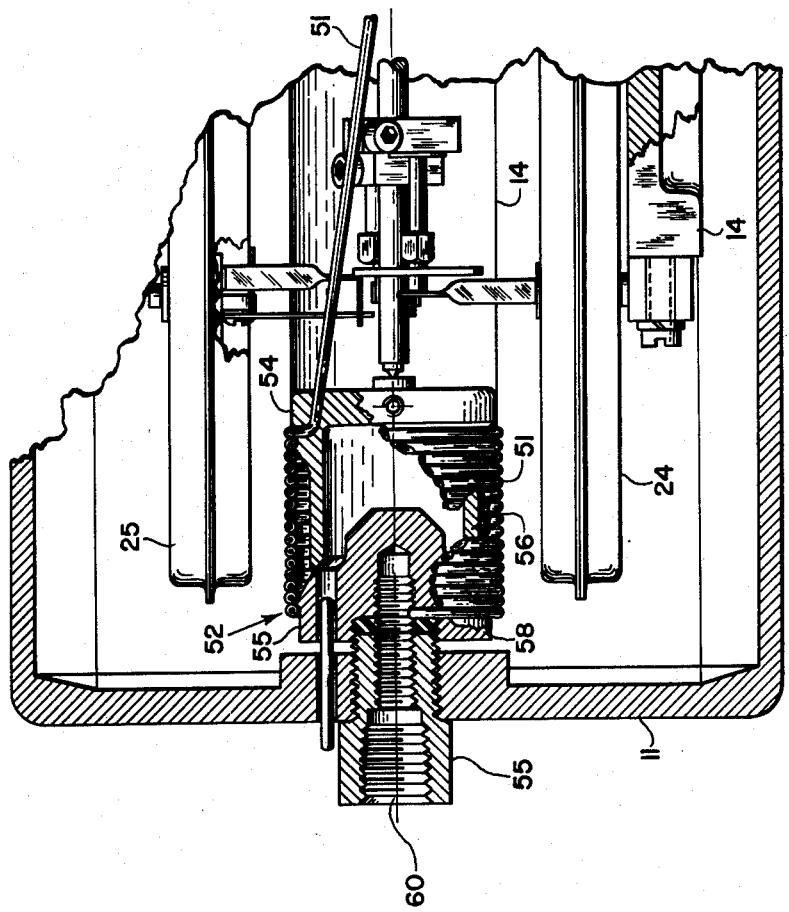

FIGURE 2 of the drawing is a cross-sectional view of the rear portion of the altimeter shown in FIGURE 1 embodying the invention.

Figure 3:
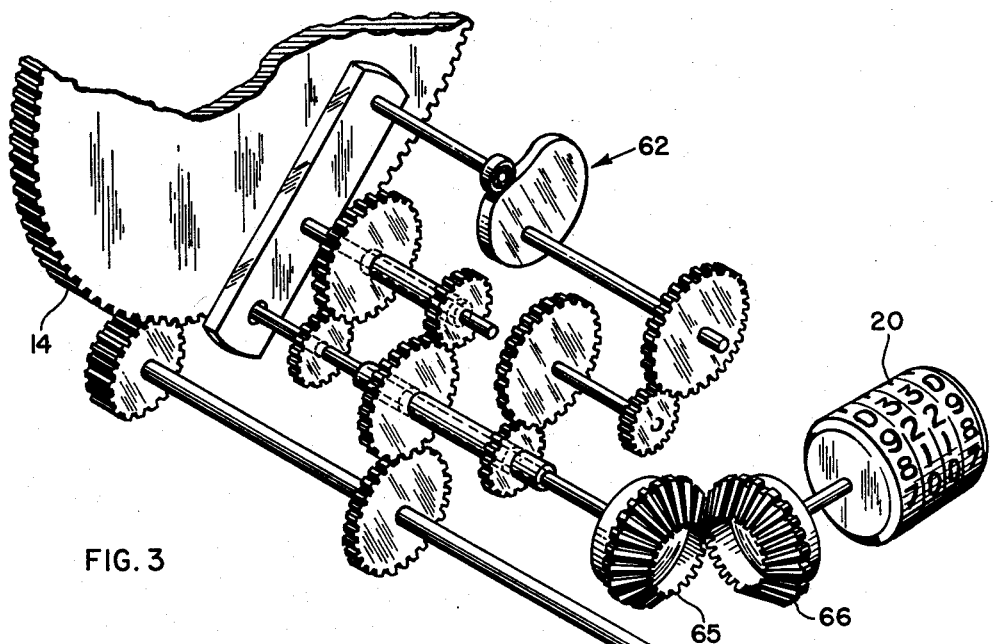

FIGURE 3 of the drawing is an exploded view in schematic form of the barometric pressure correction mechanism shown in FIGURE 1.

Figure 4:
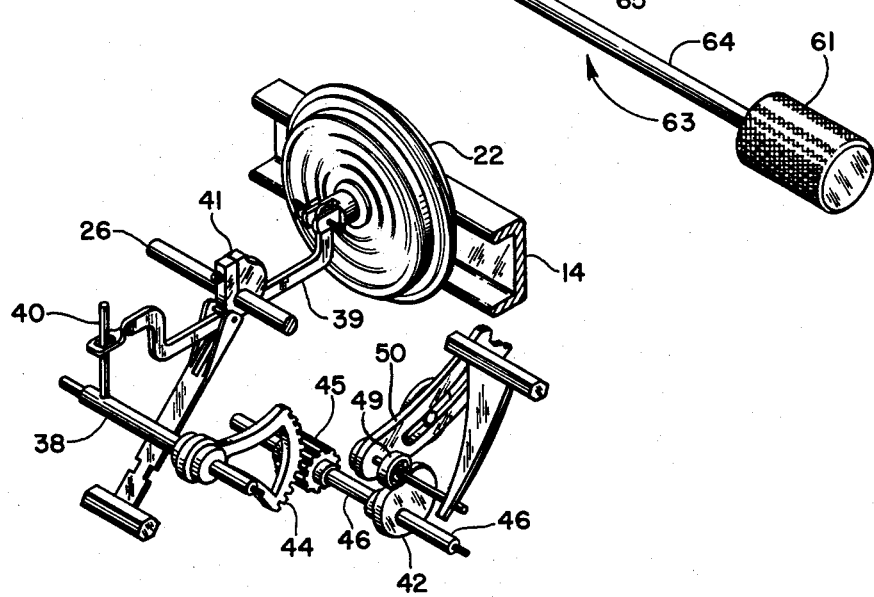

FIGURE 4 of the drawing is an enlarged view of the cam correction mechanism shown in FIGURE 1.

Figure 5:
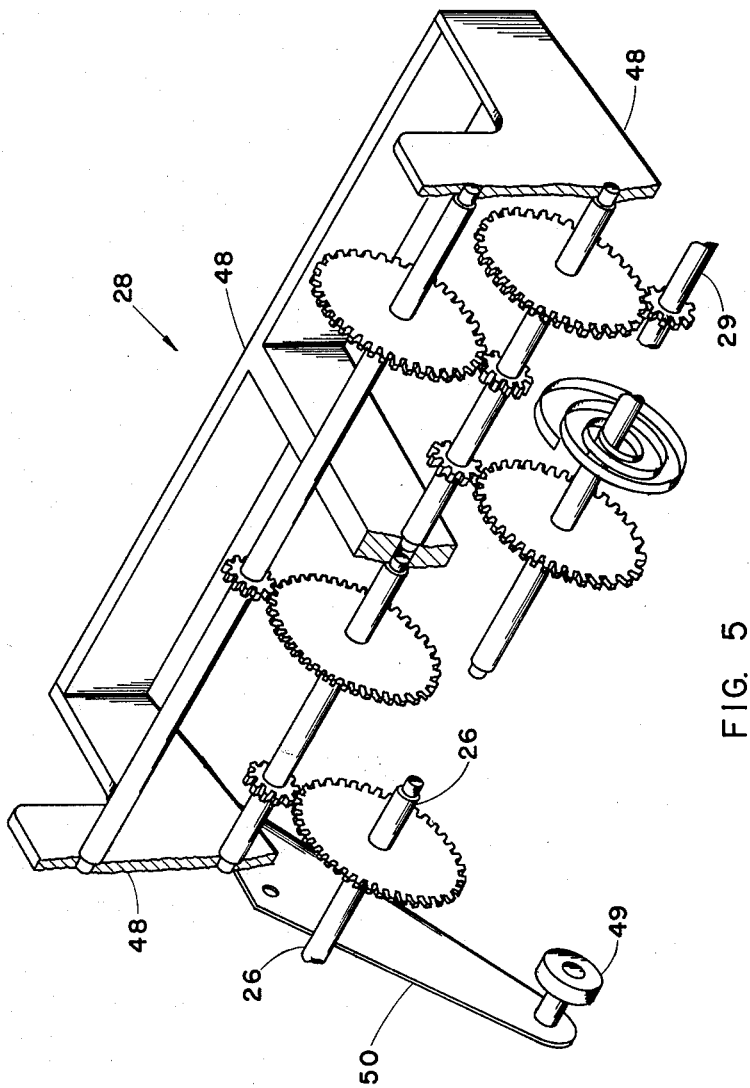

FIGURE 5 of the drawing is an exploded view in schematic form of the differential mechanism shown in FIGURE 1.

Referring now to the drawing, numeral 10 designates an altimeter which is shown in exploded and cut-away form for the purpose of clarity. Altimeter 10 includes a pressure tight housing 11 within which all of the elements of the altimeter are enclosed. The interior of housing 11 is subjected to indicated altitude pressure communicated through opening 12 by a static tube, not shown. Housing 11 has cage member 14 disposed therein and mounted by any well known means for rotation relative to the housing 11.

Dial face 15 is in a fixed position relative to housing 11 having markings thereon for indicating altitude. Dial face 15 has windows 16 and 18 formed therethrough for viewing counters 19 and 20 respectively. Counter 19 indicates altitude in increments of one hundred feet and counter 20 indicates a pre-set barometric pressure in inches of mercury. Pointer 21 is movable relative to dial face 15 wherein one revolution represents 1,000 feet of altitude.

Dynamic pressure responsive capsule 22 and static pressure responsive capsules 24 and 25 are mounted on cage member 14. Shaft 26 is pivotally mounted at one end in cage member 14 and the second end is connected to differential 28. Output shaft 29 from differential 28 passes through cage member 14 and is connected to altitude counter 19 and pointer 21.

Means for providing a shaft rotation proportional to indicated altitude pressure comprises static pressure responsive capsules 24 and 25, linkages 30 and 31, bi-metallic elements 32 and 34, and arms 35 and 36 connected to shaft 26. The rotation of shaft 26 is one input into differential 28.

A second input into differential 28 is provided by the means for correcting errors due to changes in a flight condition such as Mach number or some function of Mach number which comprises a dynamic pressure responsive capsule 22 connected to rotating shaft 38 by means of linkage 39 and 40. Rotation of shaft 38 is varied by the movement of cam 41 acting on link 39. Cam 41 is mounted on shaft 26 which is connected to static pressure responsive capsules 24 and 25. Therefore, link 39 rotates the attached shaft 38 as a direct function of Mach number. Cam 42 is connected to shaft 38 by means of gears 44 and 45 and shaft 46 is employed to correct the altitude indication for changing Mach number. Cam 42 is mounted on shaft 46 and rotates the housing 48 of differential 28 through cam follower 49 and linkage 50 to add or subtract an altitude correction.

The first input into differential 28 is provided by the rotation of shaft 26 which rotation is proportional to indicated altitude. The second input into differential 28 is provided by movement of linkage 50 which rotates housing 48, whose rotation is proportional to altitude error due to flight conditions. The output from differential 28 is provided by the rotation of shaft 29 and is directly proportional to true feet of altitude.

The interior of dynamic pressure responsive capsule 22 is in fluid communication with the air vehicle dynamic pressure line (not shown) by means of tubing 51 and coiled tubing mechanism 52. Mechanism 52 advantageously comprises support member 54 mounted on cage member 14 and support member 55 mounted on housing 11. Support member 54 has a hollow cylindrical end 56 disposed to loosely receive cylindrical end 58 of support member 55. Tubing 51 is fastened to cage member 14 by clamp 59 and loosely coiled around hollow cylindrical end 56 and a portion of cylindrical end 58. Tubing 51 passes into support member 55 and is in fluid communication with hollowed portion 60 of member 55. Hollowed portion 60 is disposed to receive a mating element of the air vehicle total pressure line (not shown). An advantageous construction of tubing 51 may comprise a coiled portion having from 19 to 21 revolutions loosely coiled on a ¾-inch diameter cylindrical end 56. Tubing of this construction may withstand a minimum of 2.71 revolutions of relative movement of cage member 14 to housing 11. Tubing of this construction has been found to have advantageous damping characteristics over tubing used in conventional instruments.

Rotation of shaft 29 is directly proportional to true feet of altitude which is indicated on dial face 15 by pointer 21 and altitude counter 19 which are directly connected to shaft 29. On landing an air vehicle, and in flight over irregular terrain, a correct indication of altitude above ground level is a necessity. To this end the altimeter includes a barometric pressure compensating mechanism 63 comprising adjusting knob 61, cam positioned differential gear train 62 and rotating cage member 14. Adjusting knob 61 through shaft 64, gear train 62, gears 65 and 66 rotate counter 20 which indicates barometric pressure in inches of mercury. A corresponding rotation of cage 14 is accomplished from shaft 64 and gear train 62. The rotation of cage 14 imparts rotation to shaft 29 and the pointer 21 and counter 19 which elements will indicate the incremental increase or decrease in feet of altitude corresponding to the increase or decrease in barometric pressure indicated in inches of mercury on counter 20. The movement between pointer 21 and counter 19 and the movement of counter 20 is a non-linear movement since the relationship between barometric pressure and pressure altitude is non-linear. This non-linearity is accomplished by cam positioned differential gear train 62 between shaft 64 and counter 20.

While the altimeter shown in the drawing is of the construction shown and described, it is understood that the instant invention is not limited to any particular form or construction. Moreover, other changes and modifications of the novel altimeter contemplated herein may be made by those skilled in the art without departing from the scope of the instant invention.

I claim:

1. An instrument for indicating true altitude above ground level wherein correction is made for variations in indicated altitude pressure incident to variations in a flight condition and ground level pressure, comprising a housing having a dynamic pressure inlet, means for indicating altitude, a shaft rotatably mounted within said housing and connected to said means for indicating an expansible element responsive to static pressures and an expansible element responsive to dynamic pressure, said elements enclosed by said housing and connected to said shaft for rotating said shaft as a function of altitude corrected for variations in said flight condition, means for moving said expansible elements relative to said housing for adjustably rotating said shaft as a function of variations in ground level pressure and a flexible conduit extending between and interconnecting said inlet and the interior of said dynamic pressure capsule.

2. An instrument for indicating true altitude above ground level wherein correction is made for variations in indicated altitude pressure incident to variations in a flight condition and ground level pressure, comprising a housing having a dynamic pressure inlet, a dial and a pointer movable relatively to one another a differential pressure responsive expansible capsule, said dial, pointer and capsule enclosed by said housing, a shaft rotatably mounted within said housing and connected to one of said dial and pointer, said housing fixed to the other of said dial and pointer, and means for rotating said shaft for moving said pointer and dial relatively to one another jointly as a function of a change in differential pressure and as a function of an independent variable compensating linkage means interconnecting said capsule and shaft for rotating said shaft as a function of the expansion of said capsule, means enclosed by said housing for rotating said shaft independently of expansion of said capsule comprising a member fixedly carrying said capsule and rotatable relative to said housing without altering the spacing between said capsule and said shaft, coiled tubing means extending between and interconnecting said inlet and the interior of said capsule for absorbing the rotational motion of said member in said housing, and means for rotating said member as a function of said independent variable.

3. An instrument for indicating true altitude above ground level wherein correction is made for variations in indicated altitude pressure incident to variations in a flight condition and ground level pressure comprising a housing having static and dynamic pressure inlets, a dial fixed relative to said housing, a pointer movable relative to said dial, a differential pressure responsive expansible capsule, a shaft connected to said pointer, said dial, pointer, capsule and shaft enclosed by said housing, linkage means interconnecting said capsule and said shaft for rotating said shaft as a function of the expansion of said capsule, a dynamic pressure responsive capsule, disposed within said housing, second linkage means interconnecting said dynamic pressure responsive capsule and said shaft for rotating said shaft jointly as a function of a change in differential pressure and the function of the expansion of said differential pressure responsive capsule, means for moving said capsules relative to said housing for adjustingly rotating said shaft independently of the expansion of said capsules comprising a cage member fixedly carrying said capsules and rotatable relative to said housing without altering the spacing between said capsules and said shaft, means for rotating said cage member as a function of ground level pressure, a coiled tubing means extending between and interconnecting said dynamic pressure inlet and the interior of said dynamic pressure responsive capsule for absorbing the rotational motion of said cage in said housing.

4. An instrument for indicating true feet of altitude above ground level wherein correction is made for variations in indicated altitude pressure incident to variations in air vehicle Mach number and barometric pressure comprising an instrument housing having static pressure and dynamic pressure inlets, a dial face displaying altitude in a fixed position relative to said housing, a pointer movable relative to said dial face, said dial and said pointer disposed within said housing, a cage member disposed within said housing and rotatable relative thereto, a differential pressure responsive expansible capsule mounted on said cage member, a rotatable shaft connected to said pointer and extending into said cage member, linkage means interconnecting said differential pressure responsive capsule and said shaft for rotating said shaft proportional to altitude as a function of the expansion of said pressure responsive capsule, a dynamic pressure responsive expansible capsule mounted on said cage member, second linkage means interconnecting said dynamic pressure responsive capsule and said shaft for correcting the rotation of said shaft for changes in Mach number variable jointly as a function of a change in differential pressure and the function of the expansion of said differential pressure responsive capsule, means for rotating said cage member without altering the spacing between said capsules and said shaft wherein said shaft is rotated as a function of barometric pressure means interconnecting said dynamic pressure inlet and said dynamic pressure responsive capsule comprising a first member connected to said dynamic pressure inlet and in fluid communication therewith, a second member mounted on said cage member and in fluid communication with said dynamic pressure responsive capsule, coiled tubing means in fluid communication with said first member and said second member for absorbing the rotational motion of said cage member in said housing.

References Cited by the Examiner
UNITED STATES PATENTS

| | | | |
|---|---|---|---|
| 2,706,407 | 4/55 | Hosford | 73—182 |
| 2,927,460 | 3/60 | Darbujan | 73—182 |
| 2,969,910 | 1/61 | Reuter | 73—182 X |
| 3,002,382 | 10/61 | Gardner | 73—182 |
| 3,009,358 | 11/61 | Angus | 73—387 X |

RICHARD C. QUEISSER, Primary Examiner.

ROBERT L. EVANS, JOSEPH P. STRIZAK, Examiners.